April 10, 1951 W. R. HEDEMAN, JR 2,548,532

CIRCUIT FOR THE GENERATION OF
A LINEARLY VARYING CURRENT
Filed Sept. 29, 1945

INVENTOR
WALTER R. HEDEMAN JR.
BY Robert T. Killman
ATTORNEY

Patented Apr. 10, 1951 2,548,532

UNITED STATES PATENT OFFICE 2,548,532

CIRCUIT FOR THE GENERATION OF A LINEARLY VARYING CURRENT

Walter R. Hedeman, Jr., Baltimore, Md., assignor to Bendix Aviation Corporation, South Bend, Ind., a corporation of Delaware Application September 29, 1945, Serial No. 619,333

7 Claims. (Cl. 250—27)

This invention relates to circuits for the generation of linearly varying recurring current pulses such as are employed in magnetic scanning circuits for use in conjunction with cathode ray tubes, and more particularly to such a circuit in which means are provided for linearizing the normally exponential current build up.

In a resistance free inductive circuit, the application of a square voltage wave to the terminals of the inductances are, however, inevitably associated with resistance which produces a deviation from this ideal form of current build-up. In addition, the ancillary circuits for the application of the voltage pulse to the inductance are possessed of finite internal impedance exaggerating the deviations from the desired linearity. Two circuits for the generation of reasonably linear current pulses are well known; in one, a thermionic tube is connected to a source of anode potential with the sweep coils located in the anode circuit, and the control grid of the tube is excited with a rectangular wave to impress across the sweep coils a substantially square wave voltage. The voltage across the inductance cannot be precisely rectangular in this arrangement due to the internal anode-cathode impedance of the tube, and hence the current through the scanning coils does not rise linearly. In the second arrangement, the scanning coils are located in the cathode, rather than the anode, circuit, thereby lowering the source impedance as seen by the scanning coils, ameliorating, rather than removing, the cause of the difficulty.

Accordingly, one of the objects of the invention is to provide a novel sweep pulse generating circuit in which deviations from the ideal wave characteristic of the sweep current pulses are minimized by the introduction of correcting voltages on the control element of the associated vacuum tube.

Another object of the invention is to provide a novel sweep pulse generating circuit in which values of the second derivative of the current other than zero generate a wave form correcting potential applied to a control element of an associated thermionic valve.

A further object of the invention is to provide a novel sweep pulse generator for use with scanning coils having a predetermined time constant in which a feedback network having substantially the same time constant is interposed between the output and input circuits of an associated thermionic amplifier tube.

The above mentioned objects and advantages of the invention are substantially accomplished by an arrangement including a thermionic vacuum tube with the inductive scanning coils situated in the output circuit thereof and a differentiating feedback circuit linking the output and input circuits, in which the time constants of the feedback circuit and the scanning coils are substantially equal.

Other objects and advantages of the invention will in part be described and in part be obvious when the following specification is read in conjunction with the drawings in which.

Figure 1:
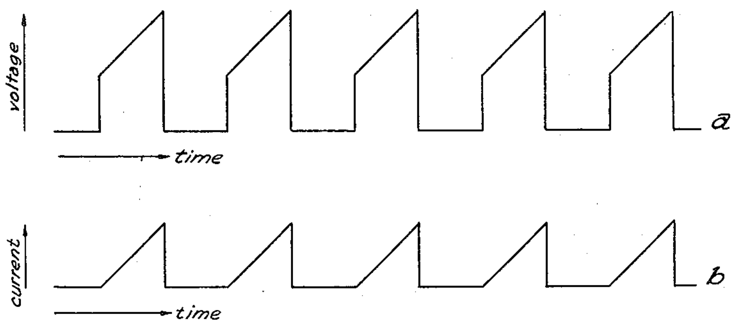
Figure 1 is a diagram illustrating one form of the scanning voltage existing at the anode of the tube supplying the sweep scanning coils, and of the scanning coil current pulses.

Referring now to Figure 1, (*a*) illustrates the ideal wave form of the voltage as applied to the anode. The wave form shown in (*b*) illustrates the ideal wave form of the current flow in the anode circuit. It is to be noted that the ideal current and voltage wave forms are characterized by a second time derivative equal to zero. During the period of forward sweep traverse it is evident that deviations from these ideal wave forms may be prevented by the introduction of a second time derivative controlled voltage with the proper sense and magnitude on the control electrode of the associated vacuum tube amplifier.

Figure 2:
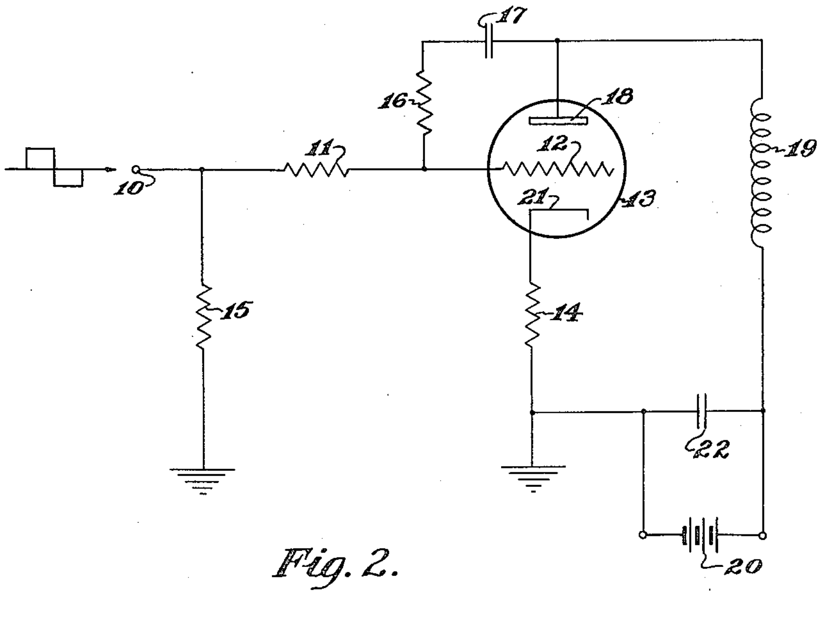
Figure 2 is a schematic diagram of a circuit incorporating the features of the invention.

A circuit having the necessary characteristics is shown in Figure 2, wherein the input terminal 10 is connected through a limiting resistor 11 to the control electrode 12 of a tube 13. The tube 13 includes in addition to control electrode 12, an anode 18 and cathode 21. A biasing resistor 14 is connected between cathode 21 and ground. A coil 19 which may be used for the magnetic deflection of a cathode ray tube is connected between the anode 18 of tube 13 and the source of voltage which may comprise a battery 20 or other suitable means. The source of voltage 20 is bypassed by capacitor 22. An inverse feedback network comprising a resistor 16 in series with a capacitor 17 is connected between anode 18 and control electrode 12 of tube 13. A resistor 15 is connected between input terminal 10 and resistor 11 and with resistor 11 serves as a path for voltage applied to the control electrode 12. The anode current in passing through the cathode resistor 14 produces a voltage, the negative polarity of which is applied to the control electrode 12 of tube 13 through a path comprising resistor 15 and the limiting resistor 11, thus normally biasing this stage near cutoff.

The advent of a positive pulse applied to the input terminal 10, however, is of sufficient magnitude to overcome the bias applied to the tube 13 and to permit the flow of anode current from the source 20 through the coil 19 and thence through the tube 13 to ground. In order to obtain a linear sweep, the current through the coil 19 must rise at a constant rate. If the coil current rises at a constant rate, the potential at the anode 18 of he tube 13 will be as shown in Figure 1 (*a*). The feedback network comprising the resistor 16 and the capacitor 17 will apply a voltage to the control electrode 12 of the tube 13 which is proportional to the rate of change of the anode potential. If non-linear sweep current is applied to the coil 19, a potential will be applied to the control electrode 12 of the tube 13 through the feedback network. This potential will be amplified in the control electrode-anode circuit and will appear in the anode circuit as a current proportional to the rate of change of anode voltage and will effectively correct that change. It will be manifest that the circuit as it stands comprises a conventional inverse feedback circuit. However, by making the time constant of the feedback circuit, comprising resistor 16 and capacitor 17, equal to the inherent time constant of the coil 19, the energy stored in the feedback and load circuits will be equal and the feedback will be of such magnitude as to produce a linear rise of anode current. In the circuit as described, no difficulties are experienced in coil recovery, since the control electrode circuit holds the stage at cutoff during recovery, and the coil voltage is allowed to swing as much as possible in order to effect rapid recovery.

The following equations constitute a mathematical analysis of the circuits as shown in Figure 2 and demonstrate the validity of the foregoing statements.

The load circuit equation is:

$$e_p+i_LR+L\frac{di_L}{dt}=0 \qquad (1)$$

The feedback circuit equation is:

$$e_p+\frac{1}{C}\int_0^t i_Cdt+i_Cr-e_g=0 \qquad (2)$$

The cathode circuit equation is:

$$e_K-i_pr_f=0 \qquad (3)$$

Current continuity requires that:

$$i_L+i_C=i_p \qquad (4)$$

from (1) and (2)

$$e_g=\frac{1}{C}\int_0^t i_Cdt+i_Cr-i_LR-L\frac{di_L}{dt}$$

and $$e_g-e_K=\frac{1}{C}\int_0^t i_Cdt+i_Cr-i_LR-L\frac{di_L}{dt}-i_pr_f \qquad (5)$$

Then, the circuit equation through the vacuum tube is:

$$i_pr_f+L\frac{di_L}{dt}+Ri_L+i_pR_p-\mu(e_g-e_K)=0 \qquad (6)$$

Substituting $\mu(e_g-e_K)$ from (6) in (5), we obtain $$\left[\frac{1}{C}\int_0^t i_Cdt+i_Cr-i_LR-L\frac{di_L}{dt}-i_pr_f\right]=i_pr_f+L\frac{di_L}{dt}+Ri_L+i_pR_p$$

which is, by collecting terms $$\frac{1}{C}\int_0^t i_Cdt+i_Cr-i_LR-L\frac{di_L}{dt}-(i_L+i_C)r_f=(i_L+i_C)\frac{R_p+r_f}{\mu}+\frac{L}{\mu}\frac{di_L}{dt}+\frac{R}{\mu}i_L$$

which is, by collecting terms $$\frac{1}{C}\int_0^t i_Cdt+i_Cr-i_Cr_f-i_C\frac{R_p+r_f}{\mu}=i_L\frac{R_p+r_f}{\mu}+i_LR+L\frac{di_L}{dt}+i_Lr_f+\frac{L}{\mu}\frac{di_L}{dt}+\frac{R}{\mu}i_L$$

which becomes $$\frac{1}{C}\int_0^t i_Cdt+i_C\left(r-\frac{1}{g_m}-r_f\frac{\mu+1}{\mu}\right)=i_L\left(\frac{1}{g_m}+r_f\frac{\mu+1}{\mu}+R\frac{\mu+1}{\mu}\right)+L\frac{\mu+1}{\mu}\frac{di_L}{dt} \qquad (7)$$

$$\left.\begin{array}{l}\text{If: } i_L=Kt\\ \text{then: } i_C=a\end{array}\right\} \qquad (8)$$

Using (8) in (7)

$$\frac{at}{C}+a\left(r-\frac{1}{g_m}-r_f\frac{\mu+1}{\mu}\right)=Kt\left(\frac{1}{g_m}+r_f\frac{\mu+1}{\mu}+R\frac{\mu+1}{\mu}\right)+LK\frac{\mu+1}{\mu} \qquad (9)$$

From Equation 9; by equating coefficients of like power of "$t$":

$$\frac{a}{C}=K\left[\frac{1}{g_m}+r_f\frac{\mu+1}{\mu}+R\frac{\mu+1}{\mu}\right] \qquad (10)$$

$$a\left[r-\frac{1}{g_m}-r_f\frac{\mu+1}{\mu}\right]=LK\frac{\mu+1}{\mu} \qquad (11)$$

The quotient of (11) by (10) gives:

$$\left(r-\frac{1}{g_m}-r_f\frac{\mu+1}{\mu}\right)C=\frac{L\frac{\mu+1}{\mu}}{R\frac{\mu+1}{\mu}+r_f\frac{\mu+1}{\mu}+\frac{1}{g_m}} \qquad (12)$$

In other words, condition (12) must be met if the equations in (8) are to be true.

If:

$$r\gg\frac{1}{g_m}+\frac{\mu+1}{\mu}r_f$$

and, $$R\frac{\mu+1}{\mu}\gg r_f\frac{\mu+1}{\mu}+\frac{1}{g_m}$$

then:

$$rC\approx\frac{L}{R}$$

where:

$R_p$—anode resistance of the tube 13.
$e_g$—voltage from control electrode 12 to ground.
$e_K$—cathode voltage applied to control electrode 12 to ground.
$\mu$—amplification factor of the tube 13.
$g_m$—control electrode to anode transconductance of tube 13.
$i_C$—feedback current.
$i_p$—anode current.
$e_p$—voltage applied to anode 18.
$e_i$—input voltage applied to terminal 10.
$i_L$—that portion of anode current which flows through load inductance L.
$r_f$—resistance of cathode resistor 14.
C—capacitance of capacitor 17.
L—inductance of coil 19.
R—resistance of coil 19.
$r$—resistance of resistor 16.

This invention has been described with relation to a system in which the introduction of a compensating voltage proportional to the second derivative of current with respect to time corrects the deviations of the wave form from the preferred sawtooth form. On the forward stroke of the sweep, the sawtooth wave is characterized by a constant positive first derivative and second derivative equal to zero. The feedback circuit comprising the capacitance and resistance introduces on the control electrode a voltage proportional to the second derivative which appears whenever the wave form tends to deviate from a linear current rise.

Various modifications of the specific embodiment of the invention, which has been described, can be made without departing from the scope of the invention as defined in the appended claims.

What is claimed is:

1. In a circuit for the generation of a current varying linearly with respect to time, an electric discharge device having a cathode, a control grid and an anode, a source of anode excitation potential having a pair of terminals, one of said terminals being connected to said cathode, an inductive load impedance characterized by a predetermined time constant connected between the other terminal of said anode excitation source and said anode, an impedance connected between said grid and said cathode, means for applying control stimuli to said control grid, and an impedance network characterized by said predetermined time constant connected between said grid and said anode.

2. In a circuit for the generation of a linearly varying current, an electric discharge device having a cathode, a control grid and an anode, a source of anode excitation energy having one terminal connected to said cathode, an inductive load impedance characterized by a predetermined time constant connected between another terminal of said anode excitation source and said anode, an impedance connected between said grid and said cathode, means for applying control stimuli to said control grid, and a resistor and capacitance connected in series between said grid and said anode, said series resistor and capacitor having a time constant substantially equal to the time constant of said inductive load.

3. In a circuit for the generation of a linearly varying current, an electric discharge device having a cathode, a control grid and an anode, a source of anode excitation energy having one terminal connected to said cathode, an inductive load impedance characterized by a predetermined time constant connected between another terminal of said anode excitation source and said anode, at least two resistors connected in series between said grid and said cathode, means for impressing control stimuli between said cathode and the junction of said series connected resistors, and a resistor and capacitance connected in series between said grid and said anode, said series resistor and capacitor having a time constant substantially equal to the time constant of said inductive load.

4. In a circuit for the generation of a current varying linearly with respect to time, an electric discharge device having input and output circuits, an inductive impedance characterized by a predetermined time constant situated in said output circuit, and means characterized by substantially said predetermined time constant feeding back energy from said output circuit to said input circuit with a sense and magnitude maintaining the second derivative of the current flow in said output circuit substantially constant, said means comprising an impedance network.

5. In a circuit for the generation of a current varying linearly with respect to time, an electric discharge device having a cathode, a control grid and an anode, an impedance included in the anode circuit, means for applying a signal voltage to the control grid and an energy coupling connection between said anode and said grid, the time constants of said impedance and said energy coupling connection being substantially equal.

6. In a circuit for the generation of a current varying linearly with respect to time, an electric discharge device having input and output circuits, an impedance situated in said output circuit, and means for feeding back energy from said output circuit to said input circuit, the time constants of said impedance and said feedback means being substantially equal.

7. In a circuit for the generation of a current varying linearly with respect to time, an electric discharge device having input and output circuits, an inductive impedance situated in said output circuit and means for feeding back energy from said output circuit to said input circuit, the time constants of said inductive impedance and said feedback means being substantially equal, said feedback means comprising an impedance network.

WALTER R. HEDEMAN, JR.

REFERENCES CITED

The following references are of record in the file of this patent:

UNITED STATES PATENTS

| Number | Name | Date |
|---|---|---|
| 2,221,015 | Wilson | Nov. 12, 1940 |
| 2,237,425 | Geiger et al. | Apr. 8, 1941 |
| 2,412,485 | Whiteley | Dec. 10, 1946 |

FOREIGN PATENTS

| Number | Country | Date |
|---|---|---|
| 528,806 | Great Britain | Nov. 7, 1940 |